Sept. 7, 1926.
C. J. REED
1,599,372
PROCESS OF HEATING MATERIALS
Original Filed Sept. 9, 1918    4 Sheets-Sheet 1
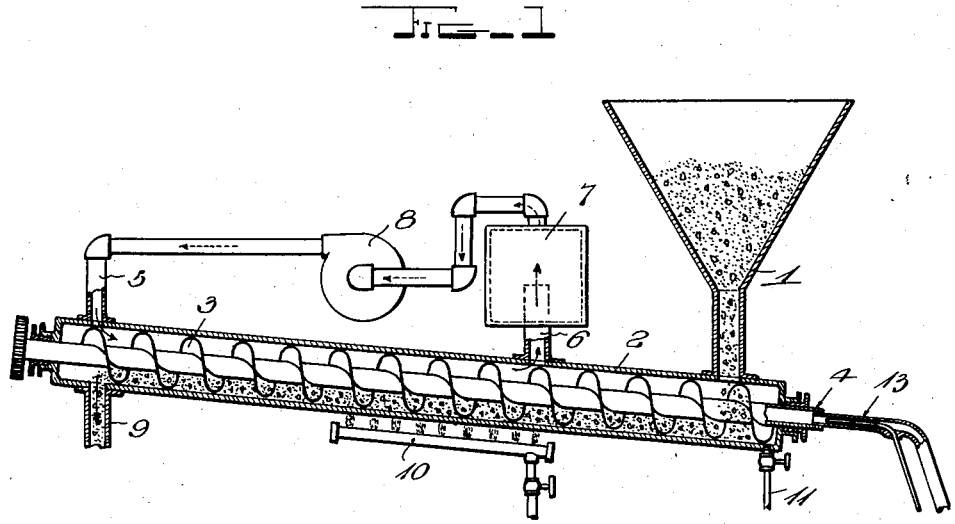
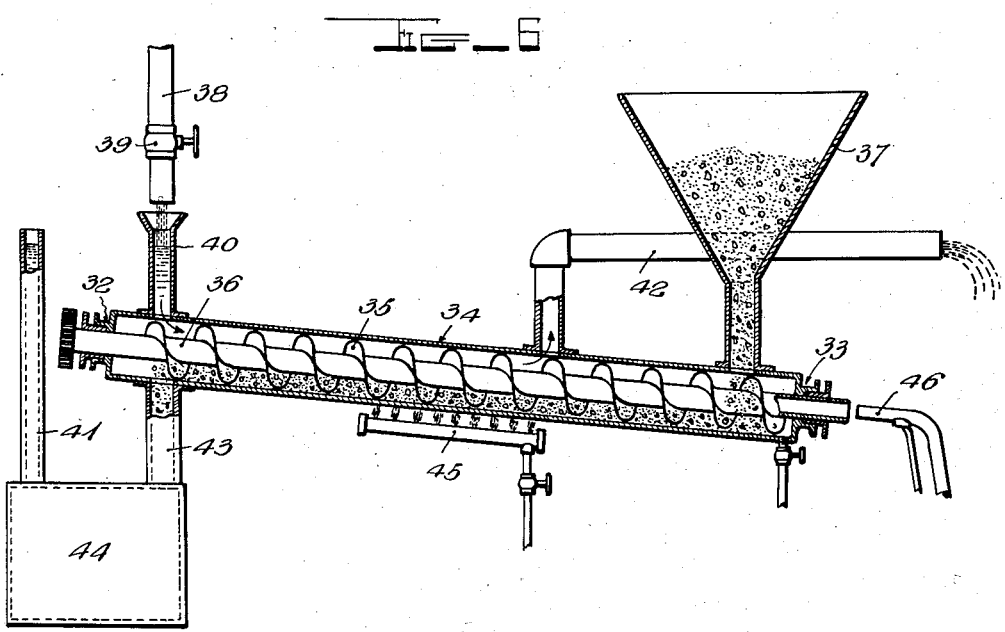
INVENTOR:
Charles J. Reed,
By Byrne Townsend & Brickenstein
ATTORNEYS.

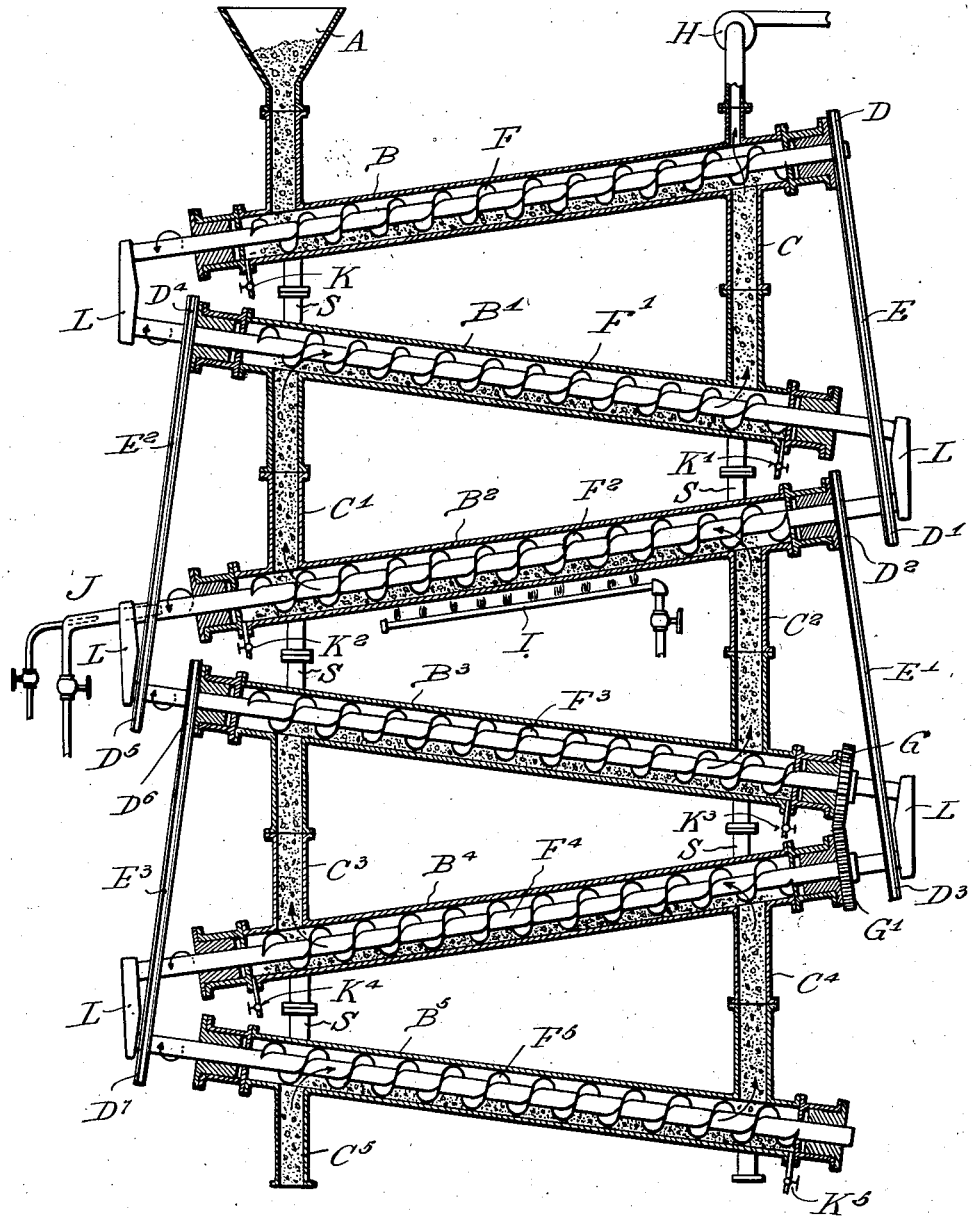

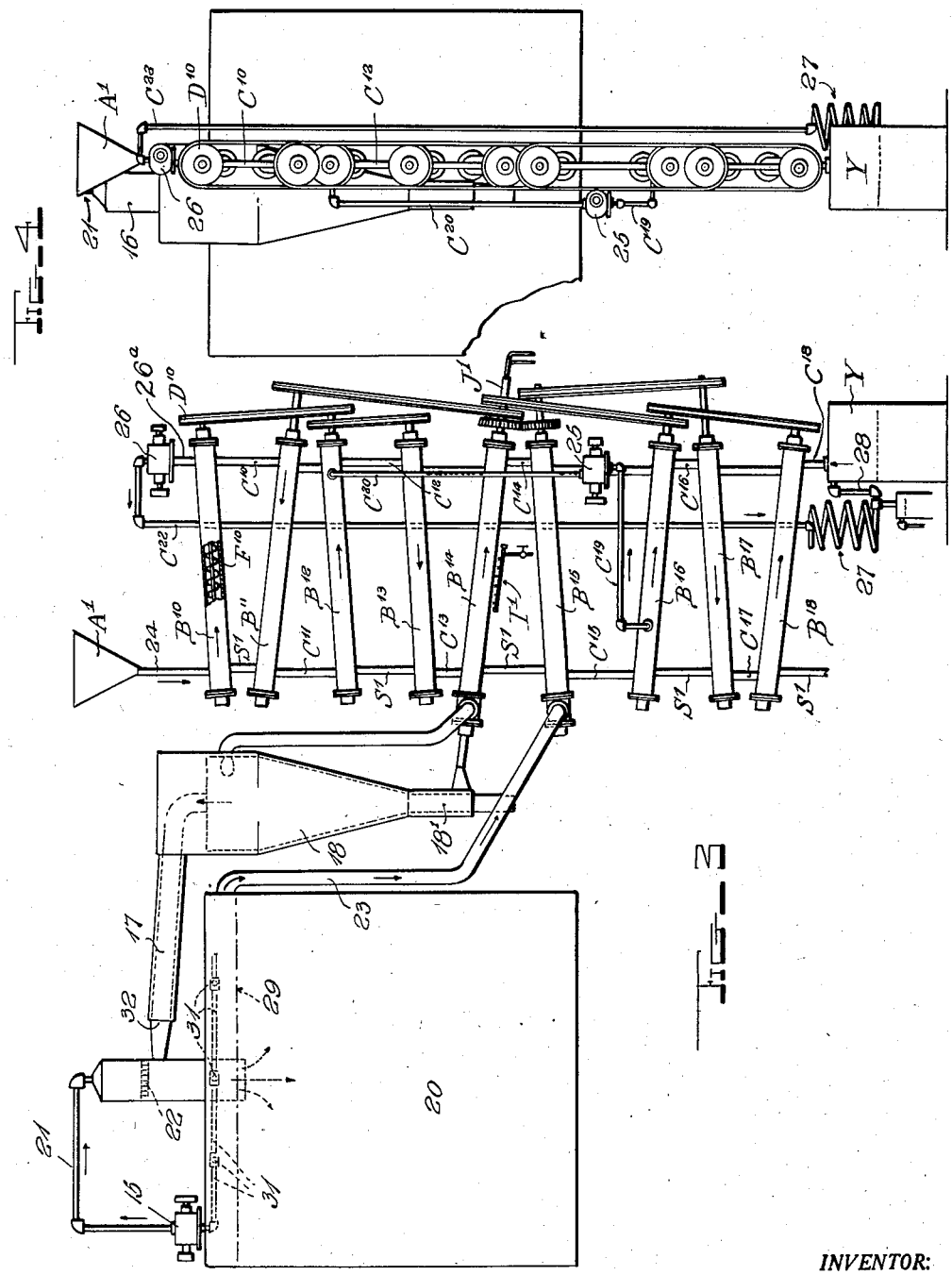

Sept. 7, 1926.
C. J. REED
1,599,372
PROCESS OF HEATING MATERIALS
Original Filed Sept. 9, 1918  4 Sheets-Sheet 4
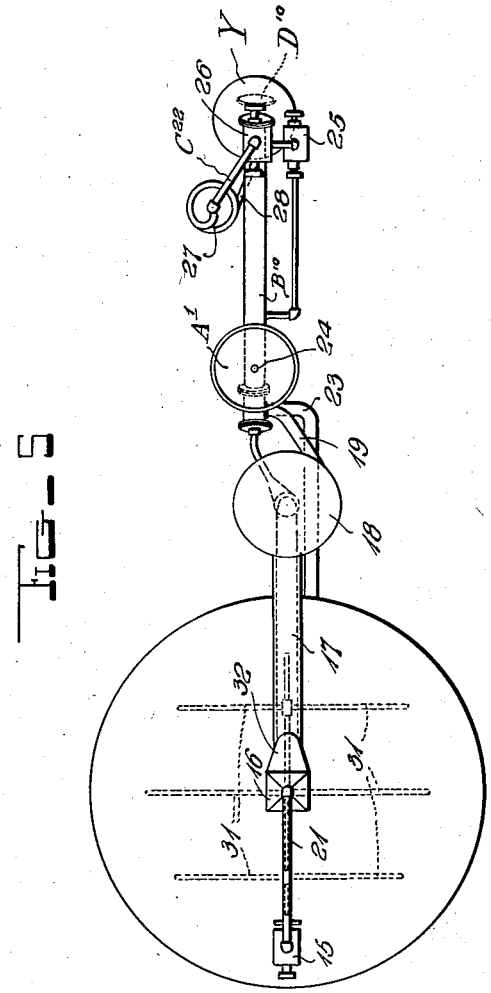
INVENTOR:
Charles J. Reed,
By Byrnes Townsend & Brickenstein,
ATTORNEYS.

Patented Sept. 7, 1926.

1,599,372

UNITED STATES PATENT OFFICE.

CHARLES J. REED, OF SAN MATEO, CALIFORNIA.

PROCESS OF HEATING MATERIALS.

Original application filed September 9, 1918, Serial No. 253,343. Divided and this application filed April 2, 1925. Serial No. 20,290.

My invention relates to the economical application of heat to solid materials, in which mechanical separations or chemical changes are to be effected. It is applicable to the separation and recovery of volatile from non-volatile substances and the separation of soluble from insoluble materials, whether these substances are originally present in the solid material or are derived from chemical changes which take place in the operation. It is applicable, for example, to the separation, recovery and refinement of sulphur from ores in which the sulphur may exist as free sulphur or in combination with other elements; to the recovery of mercury from ores and other material; to the recovery of oil from shale or sand; to the extraction of water from solid material; to the reduction of metallic oxides and other compounds to the metallic state or to other combinations; to the treatment of solids by liquids or solutions, such as the dissolving of soluble salts by liquids from insoluble sand or other material, or the dissolving or chemical alteration of the material through chemical action between a liquid and a solid.

My process consists in causing the solid material to be advanced progressively by mechanical means at controllable speed through a tubular chamber in a specific direction into and then out of a heated zone while it is at the same time subjected to the action of a current of mobile material, gas or liquid, continuously flowing in the opposite direction.

The specific form of apparatus best adapted for the treatment of any substance by my process depends on the nature of the substance, but the general form of the apparatus is that of a tube or series of tubes in either a horizontal or an inclined position. These tubes are preferably provided with internal conveyors for advancing the solid material through the apparatus at a speed which is under control.

To a portion of the tubular chamber, or to one of a series of tubes, heat is applied. This portion of the apparatus I call the hot zone. Heat may be applied to this zone either externally or internally and the heat itself may be derived from combustion or from electrical energy.

Several forms of apparatus, by which my process may be operated in connection with various materials, are illustrated in the accompanying drawings, in which—

Fig. 1 is a side view, partly sectional, of a simple form of apparatus well adapted for drying solid material containing water;

Fig. 2 is a sectional view of a form of apparatus adapted to the extraction and recovery of mercury from its ores;

Figs. 3, 4 and 5 represent in elevation, end and plan, respectively, an apparatus suitable for the recovery of sulphur from ores; and Fig. 6 is a sectional view of an apparatus for the treatment of solid material by a liquid.

In Fig. 1, 1 represents a hopper and fed-pipe for the introduction of the ore or other material into the inclined tubular chamber 2, near its lower end. Within the chamber 2 is a spiral conveyor 3, having a hollow or tubular shaft 4, adapted to revolve in the tubular chamber and advance the solid material from its point of entry upwardly towards the upper end of the chamber. 9 represents an outlet pipe on the under side of the chamber near its upper end, through which the solid material passes by gravity out of the apparatus. A current of air or other gas is caused to pass into the chamber 2, through the pipe 5, and out of 2 through the pipe 6, condenser 7 and blower 8, or other equivalent means which may be used to cause the flow of air or gas. This flow of air or gas as indicated in the drawing by arrows, is in the direction opposed to the direction of motion of the solid material. 10 represents a burner or other external source of heat applied to the walls of the chamber 2 at a point between 9 and 6. This heated part of the chamber is what I herein designate the "hot zone." 13 represents a blow pipe through which the flame of a jet of burning oil or gas may be projected into the interior of the conveyor.

The progressive motion of the solid material causes it to pass into, through and out of the hot zone while it is subjected to the oppositely flowing current of air or gas. 11 represents a drip or outlet for condensed liquid products.

When the apparatus is used for drying solid material, for example, the water expelled from the material in the hot zone is carried by the current of air downward against the incoming stream of solid material and is either carried out by the air and condensed by the condenser 7, or a portion of it may condense in the lower and cooler portion of the chamber 2 and escape at the drip 11. As the hot and completely dried solid material passes upward out of the hot zone it meets the incoming current of air and transfers its heat to the air which transports it back to the hot zone. Thus by suitably proportioning the tubes and the speeds of the solid and of the mobile material, the proper and highly economical application of heat may be obtained. When the heat is all applied internally through the hollow conveyor shaft, the external surface of the tubes may be insulated to prevent loss of heat.

Fig. 2 represents a form of apparatus adapted to the extraction of mercury from its ores. In this figure, A represents a hopper and feed-pipe for the introduction of the ore or other material into the inclined tube B, near its lower end. Within the tube B is a screw or spiral conveyor F, having a hollow or tubular shaft adapted to revolve in tube B and advance the solid material from its point of entry upwardly towards the other end of the tube. C is an outlet pipe on the under side of tube B near its upper end, through which the solid material passes by gravity out of tube B into a second similar tube $B^1$. From $B^1$ it passes similarly into tube $B^2$, thence successively into tubes $B^3$, $B^4$, and $B^5$. Tubes B, $B^2$ and $B^4$ are parallel and their conveyors are all revolved in the same direction by means of the sprockets D, $D^1$, $D^2$ and $D^3$ and the sprocket-chains E and $E^1$. Similarly tubes $B^1$, $B^3$ and $B^5$ are parallel and their conveyors are all revolved in one direction opposite to that of the conveyors in tubes B, $B^2$ and $B^4$ by means of the sprockets $D^4$, $D^5$, $D^6$ and $D^7$ and the sprocket-chains $E^2$ and $E^3$. The conveyors $F^3$ and $F^4$ are connected by beveled gears G and $G^1$. This arrangement causes all conveyors to advance the ore from the lower ends of the tubes to the upper ends. From the upper end of one tube the ore drops vertically to the lower end of the next tube below until it finally passes out at discharge-outlet $C^5$. A current of air or other gas is produced in the series of tubes by the exhaust blower H, in the direction indicated by the arrows. This air enters at the ore-outlet $C^5$ and passes in the direction indicated by the arrows through and over the ore, but in the direction opposite to the movement of the ore. This current of air flows through the entire system, passing out through the exhaust fan or blower H.

One of the central tubes $B^2$ is used as the hot zone of the retort and its temperature and that of its contents should be maintained at 400° C. or at a higher temperature. This may be done by means of the external source of heat I, or by the flame of a blow pipe J, projected into the interior of the hollow shaft of the conveyor $F^2$, or by both of these means. The heated ore in $B^2$ is thus exposed to the downwardly flowing current of air, which is to some extent preheated by having already passed over and through the hot residual ore in the tubes $B^3$, $B^4$ and $B^5$. In practice I prefer to surround the entire apparatus or at least the tubes B, $B^1$, $B^2$, $B^3$, $B^4$ and $B^5$ with heat-insulating material, not shown in the drawing, to prevent loss of heat by radiation. The cold air entering the system at the ore outlet $C^5$ and passing over the hot residual ore in the tubes $B^3$, $B^4$, and $B^5$ is preheated by extracting heat from the ore and when this preheated air reaches the hot zone its temperature is practically equal to that of the hot zone. This current of hot air, passing over the heated ore in the hot zone, transports the vapor of mercury with it and oxidizes the cinnabar, carrying the products of that reaction, mercury and sulphur dioxide, with it. The vapor of mercury, passing downward out of the hot zone, is partially condensed at the lower end of the tube $B^2$, the condensed portion passing out through the sealed or trapped outlet $K^2$. Any vapor of mercury which is not condensed in tube $B^2$ passes by suction upward through the vertical pipe $C^1$ into the tube $B^1$ and through tube $B^1$ from its upper to its lower end, giving up its heat to the upwardly moving incoming ore. In this tube an additional quantity of mercury vapor, and probably some water vapor, is condensed and the condensed portion flows out at the trapped outlet $K^1$. This condensing action is continued in as many additional tubes as may be desired or found necessary to condense the last trace of mercury vapor and transfer the last traces of available heat from the out-going gases to the incoming ore.

The heated ore in the hot zone, tube $B^2$, after having been thoroughly cleaned from mercury and transported by the conveyor to the upper end of tube $B^2$, drops by gravity into the lower end of tube $B^3$, meeting the incoming current of air from below and transferring a portion of its heat to the air. Also, in being conveyed through tube $B^3$ from its lower to its upper end, the ore gives up to the oppositely moving stream of incoming air a further portion of its heat, and this process is continued in succession in the next lower tube $B^4$, and then in $B^5$ and in as many additional tubes as may be necessary to completely transfer all available heat from the outgoing ore to the incoming air. The tubes $B^3$, $B^4$, $B^5$ and all tubes below the hot zone may be inclined, as shown in the drawing, or may be parallel and horizontal or in any suitable position, as there is no mercury vapor in this part of the apparatus to be condensed and a form of construction should be used which will to the best advantage facilitate the forward motion of the ore and at the same time be least objectionable in its construction and operation from a mechanical standpoint.

In this arrangement it will be noted that the condensed mercury is always in a position, on becoming liquid, to flow away from the hot zone towards the incoming ore. It will also be seen that, as both the ore and the air enter the apparatus cold and leave the apparatus cold, the only loss of heat will be through the walls of the apparatus, which may, by suitable insulation, be reduced to any required minimum.

In the drawing, the ends of the hollow revolving conveyors are inclosed in hoods L, to permit a continuous flow of the products of combustion from the interior of one tube to another. While this is generally advantageous, it is not absolutely necessary.

The construction of the tubes B, $B^1$, $B^2$, etc. and the discharge tubes or chutes C, $C^1$, $C^2$ etc. is supplemented by vertical supports S, preferably of tubular form alternating with the chutes C as supporting elements.

Figs. 3, 4 and 5 represent a modified form of my apparatus particularly adapted to the recovery of free sulphur and other volatile substances from mechanical mixtures and volatile substances originating in chemical reactions.

In this form of apparatus I prefer to arrange the tubes $B^{10}$, $B^{11}$, $B^{12}$, etc. in the positions shown in the drawing. In Figs. 3, 4 and 5 an apparatus comprising nine tubes is shown, but any required number of tubes may be used. The central tube $B^{14}$, constitutes the hot zone. As a current of air could not be used to transport the vapor of sulphur without oxidizing it to sulphur dioxide, an inert gas or gaseous mixture must be used. In order to be able to use this inert gas or gaseous mixture over and over again, the construction of the apparatus must be different in details from that shown in Figs. 1 and 2.

In this form of apparatus I prefer to segregate the tubes into three groups, the hot zone, comprising the tubes $B^{13}$, $B^{14}$ and $B^{15}$, the upper or inlet zone, comprising the tubes $B^{10}$, $B^{11}$ and $B^{12}$ and the lower or outlet zone, comprising the tubes $B^{16}$, $B^{17}$ and $B^{18}$. The ore from the hopper $A^1$ is conveyed through tube $B^{10}$ from the lower to the upper end thereof, where it falls through chute $C^{10}$ into the lower end of tube $B^{11}$, whence it is conveyed through $B^{11}$ from its lower to its upper end and dropped through chute $C^{11}$ into the lower end of tube $B^{12}$, thence to the upper end of tube $B^{12}$ and dropped through chute $C^{12}$ into the upper end of tube $B^{13}$, thence through tube $B^{13}$ to its lower end and dropped through chute $C^{13}$ into the upper end of tube $B^{14}$, thence through tube $B^{14}$ to its lower end and dropped through chute $C^{14}$ into the upper end of tube $B^{15}$, thence through tube $B^{15}$, chute $C^{15}$, tube $B^{16}$, chute $C^{16}$, tube $B^{17}$, chute $C^{17}$, tube $B^{18}$, and chute $C^{18}$, finally leaving the apparatus through outlet $C^{18}$ and dropping into the closed receptacle Y. The tube $B^{14}$ is supplied with means for heating, either through the hollow shaft by means of a blow-pipe $J^1$ or by means of a furnace flame or burner $I^1$ or by hot gases directed against the external surface of the tube $B^{14}$.

By means of the blower 15 and the aspirator 16, a partial vacuum is produced and maintained in the tube 17, dust-separator 18, pipe 19, tubes $B^{14}$ and $B^{15}$, causing the gases to flow out of tube $B^{14}$ in the direction indicated by the arrows through the dust-separator and aspirator into the condensing-chamber 20. The aspirator 16 consists of a vertical rectangular tube open at the lower end and connected at the upper end with the blower 15, through pipe 21 and having a diaphragm 22, perforated by numerous small holes. Above the diaphragm a pressure of the gases is produced by the blower 15. The gases issuing at high velocity, through the perforations cause a partial vacuum on the lower side of the diaphragm, which draws the mixed sulphur vapor and inert gases from the tube 17, and forces them downward into the chamber 20, at the same time cooling and condensing the sulphur vapor into flowers of sulphur. The partial vacuum in tube $B^{14}$ causes the gases in chamber 20 to return, as indicated by arrows, through the pipe 23 into the tube $B^{15}$.

The vertical chutes $C^{12}$ and $C^{15}$ are partly filled with the ore, which acts as a gate to prevent free passage of the gases through them. The hopper $A^1$ and its outlet tube 24, also contain solid material which prevents the free passage of gases through the hopper. 25 and 26 are blowers which cause a current of gases to enter into the system through chute $C^{18}$ in the direction indicated by arrows and to flow successively through tube $B^{18}$, chute $C^{17}$, tube $B^{17}$, chute $C^{16}$, tube $B^{16}$, pipe $C^{19}$, pump 25, pipe $C^{20}$, tube $B^{12}$, chute $C^{11}$, tube $B^{11}$, chute $C^{10}$ to the upper end of tube $B^{10}$ and from there through pipe $26^a$ to pump 26 and pipe $C^{22}$, thence through the condenser 27, pipe 28, and the reservoir Y, making a complete circuit.

The spiral conveyor $F^{10}$ driven by the sprocket gear $D^{10}$ advances the ore through the tube $B^{10}$ from the lower to the upper end until it falls through chute $C^{10}$ into the lower end of tube $B^{11}$, whence it passes successively through tube $B^{11}$, chute $C^{11}$, tube $B^{12}$, chute $C^{12}$, tube $B^{13}$, chute $C^{13}$, tube $B^{14}$, chute $C^{14}$, tube $B^{15}$, chute $C^{15}$, tube $B^{16}$, chute $C^{16}$, tube $B^{17}$, chute $C^{17}$, tube $B^{18}$ and pipe $C^{18}$ into the reservoir Y. The vapor of sulphur is condensed in chambers 16 and 20, collecting on the bottom of chamber 20. The chamber 20 is filled with inert gases, most conveniently a mixture of atmospheric nitrogen and sulphur dioxide. This mixture is automatically formed in the closed system of tubes and receptacles constituting the apparatus when the contained oxygen combines with sulphur at the beginning of the operation. The lower end of the aspirator extends downward through a cloth diaphragm or screen 29, which divides the chamber 20 into lower and upper compartments. The cloth screen acts as a filter to allow the inert gases to return to the blower 15 by a suitable suction-distributing pipe system 31 and prevents the finely divided sulphur dust from being drawn back into the blower. The pipe 23, opening into tube $B^{15}$ and into chamber 20 above the diaphragm 29 allows free circulation of the inert gases through the hot zone. The sulphur is converted into vapor in the tube $B^{14}$ and this vapor with the inert gases is drawn by the aspirator 16 through the pipe 19, dust separator 18 and pipe 17 into the aspirator.

Heat is conveyed into the interior of tube $B^{14}$ from a blow-pipe flame projected into its hollow conveyor shaft. The products of this combustion pass through the hollow shaft into a jacket $18^1$, inclosing dust-separator 18 and pipe 17, and finally escape at outlet 32, thereby maintaining the temperature of the dust-separator and the tube 17 above the vaporizing temperature of sulphur. The inert gases in returning through tube $B^{15}$ absorb heat from the residual ore and transport it back into tube $B^{14}$, where it is again utilized in raising the temperature of the ore and vaporizing sulphur. The residual ore passing from tube $B^{15}$ into tube $B^{16}$ still contains some available heat which, in passing through tubes $B^{16}$, $B^{17}$ and $B^{18}$, is transferred to the oppositely moving stream of air or inert gases produced in these tubes by the suction-blower 25 through the pipe $C^{19}$ connected to the tube $B^{10}$. The gases thus heated by heat extracted from residual ore or tailings pass upward through pipe $C^{20}$ into the upper end of tube $B^{12}$ and successively through tube $B^{12}$, chute $C^{11}$, tube $B^{11}$, chute $C^{10}$, blower 26, pipe $C^{22}$, condensing-coil 27, pipe 28 and receptacle Y. These heated gases in passing through tubes $B^{12}$ and $B^{11}$ against the stream of incoming ore preheat the ore and vaporize the moisture contained therein. This moisture is either condensed and rejected by outlets at the lower ends of tubes $B^{12}$, $B^{11}$ and $B^{10}$, or is carried out through the blower 26 and condensed in the coil 27.

Supports $S^1$ similar to the supports S previously described in connection with Fig. 2 alternate with chutes $C^{10}$ etc., to support the tube $B^{10}$ etc.

Fig. 6 represents a form of apparatus adapted for the treatment of a solid by a liquid, such as dissolving of soluble from insoluble constituents or for causing a solid and a liquid to react chemically.

In this form of apparatus, liquid-proof bearings or "stuffed" bearings for the revolving conveyor shaft are provided to prevent leakage. The apparatus is filled with the liquid and a hydrostatic head or pressure of the liquid is provided with a source of supply and a constant-level outlet, giving a controllable flow of the liquid through the apparatus.

In Fig. 6, 34 represents a fixed tube of suitable material containing a spiral conveyor 35 provided with a tubular shaft 36 mounted in liquid proof bearings 32 and 33. The tube 34 may be horizontal or inclined at any angle suitable to the purpose intended. 37 represents a hopper with a feed-tube for the introduction of the solid material. 38 represents a source of the liquid under control by the stop-cock 39. 40 and 41 represent stand-pipes, into either of which the liquid may be fed. 42 represents an outlet pipe, the height of which determines the height of the liquid in the apparatus. 43 represents an outlet pipe and 44 a receptacle for the solid material under treatment. The solid material is advanced through the tube 34 by the conveyor 35 as shown, or by any other suitable means against a stream of the liquid flowing in the opposite direction. Heat may be applied externally by any suitable device 45 at any point of the tube 34 between the entrance and exit of the liquid and the solid, or it may be applied internally through the interior of the tubular conveyor-shaft by a blow pipe 46. This type of apparatus is subject to great flexibility as to the form and position of the tubular retort. It may, for example, be vertical and arranged to cause either the liquid or the solid to move upwards.

While I have shown a spiral conveyor in the drawings as the means of transporting the solid material through the reaction chamber, I do so only for purposes of illustration and do not limit myself to that means. It is evident that other devices could be used, such as reciprocating drags, plows or scoops. Also the chamber itself may be made to revolve or reciprocate in such a manner as to advance the solid material from one end to the other.

This application is a division of my application Serial No. 607,922, filed December 19, 1922, on which Patent No. 1,534,737 was granted, which application was a division of my earlier application Serial No. 253,343, filed September 9, 1918 on which Patent No. 1,447,888 was granted.

I claim:

1. In the heat-treatment of solid material, the process which consists in causing the solid material to move progressively from a lower level to a higher level into and out of a heated zone against a stream of chemically active gas.

2. In the heat-treatment of oxidizable ores the process which consists in causing the ore to move progressively from a lower to a higher level into and out of a heated zone against a stream of an oxidizing gas.

3. In the heat-treatment of ores of mercury, the process which consists in causing the ore to move progressively from a lower to a higher level into and out of a heated zone against a stream of air.

In testimony whereof, I affix my signature.

CHARLES J. REED.